United States Patent
Yilmaz et al.

(10) Patent No.: US 12,414,159 B2
(45) Date of Patent: Sep. 9, 2025

(54) CONFIGURATION INDICATION

(71) Applicant: Nokia Technologies Oy, Espoo (FI)

(72) Inventors: Osman Nuri Can Yilmaz, Espoo (FI); Ömer Bulakci, Munich (DE); Muhammad Naseer-Ul-Islam, Munich (DE)

(73) Assignee: Nokia Technologies Oy, Espoo (FI)

( * ) Notice: Subject to any disclaimer, the term of this patent is extended or adjusted under 35 U.S.C. 154(b) by 159 days.

(21) Appl. No.: 18/251,499

(22) PCT Filed: Oct. 18, 2021

(86) PCT No.: PCT/FI2021/050693
§ 371 (c)(1),
(2) Date: May 2, 2023

(87) PCT Pub. No.: WO2022/101543
PCT Pub. Date: May 19, 2022

(65) Prior Publication Data
US 2023/0397260 A1    Dec. 7, 2023

Related U.S. Application Data

(60) Provisional application No. 63/112,362, filed on Nov. 11, 2020.

(51) Int. Cl.
*H04W 74/08* (2024.01)
*H04W 74/0833* (2024.01)

(52) U.S. Cl.
CPC ............... *H04W 74/0833* (2013.01)

(58) Field of Classification Search
CPC . H04W 40/22; H04W 48/18; H04W 74/0833; H04W 40/20; H04W 74/0836; H04W 74/0838
See application file for complete search history.

(56) References Cited

U.S. PATENT DOCUMENTS 10,057,777 B2   8/2018 Li et al.
2017/0367036 A1* 12/2017 Chen .................... H04W 48/16
(Continued)

FOREIGN PATENT DOCUMENTS

EP   3544335 A1   9/2019
EP   3544335 A4   2/2020
(Continued)

OTHER PUBLICATIONS

"3rd Generation Partnership Project; Technical Specification Group RAN; NR; Study on enhancement of Radio Access Network (RAN) slicing (Release 17)", 3GPP TR 38.832, V0.2.0, Sep. 2020, 13 pages.
(Continued)

*Primary Examiner* — Brian D Nguyen
(74) *Attorney, Agent, or Firm* — Brake Hughes Bellermann LLP

(57) ABSTRACT

There is provided an apparatus, comprising means for performing: receiving a first message, the first message indicating information for at least one network slice identity in one or more radio network areas; receiving a second message, the second message indicating configuration information for one or more network slices; determining a configuration to be used for a given network slice based on the first and second messages.

20 Claims, 7 Drawing Sheets

```
300: RECEIVING A FIRST MESSAGE INDICATING INFORMATION FOR
AT LEAST ONE NETWORK SLICE IDENTITY IN ONE OR MORE RADIO NETWORK AREAS
                        ↓
302: RECEIVING A SECOND MESSAGE INDICATING
CONFIGURATION INFORMATION FOR ONE OR MORE NETWORK SLICES
                        ↓
304: DETERMINING A CONFIGURATION TO BE USED FOR A GIVEN NETWORK SLICE
BASED ON THE FIRST AND SECOND MESSAGES
```

(56) References Cited

U.S. PATENT DOCUMENTS

| | | | |
|---|---|---|---|
| 2019/0174561 A1 | 6/2019 | Sivavakeesar | |
| 2019/0349838 A1 | 11/2019 | Futaki et al. | |
| 2022/0303884 A1* | 9/2022 | Chen | H04W 76/00 |
| 2022/0394608 A1* | 12/2022 | Luo | H04W 60/00 |
| 2023/0050458 A1* | 2/2023 | Zhang | H04W 48/18 |
| 2023/0092324 A1* | 3/2023 | Seidel | H04W 36/06 |
| | | | 370/329 |
| 2023/0180301 A1* | 6/2023 | Seidel | H04W 74/006 |
| | | | 370/329 |

FOREIGN PATENT DOCUMENTS

| | | |
|---|---|---|
| EP | 3618505 A1 | 3/2020 |
| GB | 2552844 A | 2/2018 |
| JP | 2018-521525 A | 8/2018 |
| JP | 2019-519993 A | 7/2019 |
| JP | 2019-525651 A | 9/2019 |
| WO | 2016/195617 A1 | 12/2016 |
| WO | 2017/218762 A1 | 12/2017 |
| WO | 2018/061293 A1 | 4/2018 |
| WO | 2020/164471 A1 | 8/2020 |

OTHER PUBLICATIONS

"3rd Generation Partnership Project; Technical Specification Group Radio Access Network; NR; NR and NG-RAN Overall Description; Stage 2 (Release 16)", 3GPP TS 38.300, V16.3.0, Sep. 2020, pp. 1-148.

"3rd Generation Partnership Project; Technical Specification Group Radio Access Network; NG-RAN; Xn application protocol (XnAP) (Release 16)", 3GPP TS 38.423, V16.3.0, Sep. 2020, pp. 1-451.

"3rd Generation Partnership Project; Technical Specification Group Services and System Aspects; System architecture for the 5G System (5GS); Stage 2 (Release 16)", 3GPP TS 23.501, V16.6.0, Sep. 2020, pp. 1-447.

"3rd Generation Partnership Project; Technical Specification Group Core Network and Terminals; Numbering, addressing and identification; (Release 16)", 3GPP TS 23.003, V16.4.0, Sep. 2020, pp. 1-141.

"Email discussion on open issues for RAN slicing SI", 3GPP TSG-RAN WG2 Meeting #112 electronic, R2-2010366, Agenda: 8.8.1, CMCC, Nov. 2-13, 2020, pp. 1-71.

"3rd Generation Partnership Project; Technical Specification Group Radio Access Network; NG-RAN; NG Application Protocol (NGAP) (Release 16)", 3GPP TS 38.413, V16.3.0, Sep. 2020, pp. 1-466.

"IEEE 802.11", Wikipedia, Retrieved on May 11, 2023, Webpage available at : https://en.wikipedia.org/wiki/IEEE_802.11.

International Search Report and Written Opinion received for corresponding Patent Cooperation Treaty Application No. PCT/FI2021/050693, dated Jan. 17, 2022, 16 pages.

Extended European Search Report received for corresponding European Patent Application No. 21891292.1, dated Jan. 22, 2024, 8 pages.

Office action received for corresponding Japanese Patent Application No. 2023-528112, dated Jun. 18, 2024, 6 pages of office action and 10 pages of office action translation available.

Office Action for India Patent Application No. 202317031496, mailed on Jun. 13, 2025, 8 pages.

* cited by examiner

400: PROVIDING TO A USER EQUIPMENT A FIRST MESSAGE, THE FIRST MESSAGE INDICATING AT LEAST, FOR EACH OF ONE OR MORE RADIO NETWORK AREAS, HOW A GIVEN NETWORK SLICE IS INDEXED IN A SECOND MESSAGE IN A GIVEN RADIO NETWORK AREA.

FIG. 4A

402: PROVIDING TO THE USER EQUIPMENT A SECOND MESSAGE, THE SECOND MESSAGE INDICATING MAPPING BETWEEN DIFFERENT CONFIGURATIONS AND DIFFERENT NETWORK SLICES, WHEREIN EACH NETWORK SLICE IS IDENTIFIED IN THE SECOND MESSAGE BY AN INDEX SPECIFIC TO THE RADIO NETWORK AREA WHERE THE SECOND MESSAGE IS RECEIVED

404: DETECTING FROM THE USER EQUIPMENT A RANDOM ACCESS PREAMBLE ON A RANDOM ACCESS CONFIGURATION, WHEREIN THE CONFIGURATION IS DETERMINABLE BY THE USER EQUIPMENT BASED AT LEAST PARTIALLY ON THE SECOND MESSAGE

406: DETERMINING A NETWORK SLICE THE USER EQUIPMENT REQUIRES BASED ON THE RANDOM ACCESS CONFIGURATION

FIG. 4B

| SLICE ID [SST] | SLICE INDEX [TA 0, TA 1, TA 2, ...] |
|---|---|
| 0 | [0, 2, 3, ...] |
| 1 | [2, 1, 0, ...] |
| 2 | [1, 3, 2, ...] |

FIG. 5A

| SLICE ID [SST, SD] | SLICE INDEX [TA 0, TA 1, TA 2, ...] |
|---|---|
| [0, 0] | [0, 2, 3, ...] |
| [1, 0] | [2, 1, 0, ...] |
| [2, 0] | [1, 3, 2, ...] |
| [2, 1] | [3, 0, 1, ...] |

FIG. 5B

| SLICE ID [SST] | SLICE INDEX [TA 0, TA 1, TA 2, ...] | CON. INDEX [TA 0, TA 1, TA 2, ...] |
|---|---|---|
| 0 | [0, 2, 3, ...] | [1, 0, 4, ...] |
| 1 | [2, 1, 0, ...] | [2, 2, 1, ...] |
| 2 | [1, 3, 2, ...] | [0, 3, 0, ...] |

FIG. 5C

| PRACH CONFIG. INDEX | SLICE INDEX |
|---|---|
| 0 | 2 |
| 1 | 2 |
| 2 | 2 |
| 3 | [0, 2] |
| 4 | 1 |
| ... | ... |
| N-1 | 3 |
| N | 3 |

FIG. 6A

CONFIGURATION INDICATION

RELATED APPLICATION

This application was originally filed as a Patent Cooperation Treaty Application No. PCT/FI2021/050693 filed on Oct. 18, 2021, which claims priority of a U.S. provisional application No. 63/112,362 filed on Nov. 11, 2020, both of which are hereby incorporated in their entirety.

TECHNICAL FIELD

Various example embodiments relate generally to configuration indication in a network comprising network slices.

BACKGROUND networks are designed to support very diverse and extreme requirements for latency, throughput, capacity, and availability. Network slicing offers a solution to meet the requirements of all use cases in a common network infrastructure. Network slicing may be described as a network architecture that enables multiplexing of virtualized and independent logical networks on the same physical network infrastructure. Each network slice can be seen as an isolated end-to-end network tailored to fulfil diverse requirements requested by a particular application. As such, network slicing may support different services using the same underlying mobile network infrastructure. Network slices can differ either in their service requirements like Ultra-Reliable Low Latency Communication (URLLC) and enhanced Mobile Broadband (eMBB), or the tenant that provides those services.

Different network slices may benefit from use of dedicated configurations. However, at the same the provision of the configurations cannot be too transparent, in order to avoid fraudulent behaviour. E.g. for accessing a network, a user equipment may use a random access (RA) procedure. This procedure includes e.g. transmitting a RA preamble in uplink on a RA resource. Some network slices may benefit from being associated with predetermined RA configuration or resources.

BRIEF DESCRIPTION

According to some aspects, there is provided the subject matter of the independent claims. Some further aspects are defined in the dependent claims. The embodiments that do not fall under the scope of the claims are to be interpreted as examples useful for understanding the disclosure.

LIST OF THE DRAWINGS

In the following, the invention will be described in greater detail with reference to the embodiments and the accompanying drawings, in which FIG. 1 presents a communication network, according to an embodiment;

FIGS. 3, 4A and 4B show methods, according to some embodiments;

FIGS. 5 and 6 illustrate what first and second messages may comprise, according to some embodiments;

DESCRIPTION OF EMBODIMENTS

Figure 1:
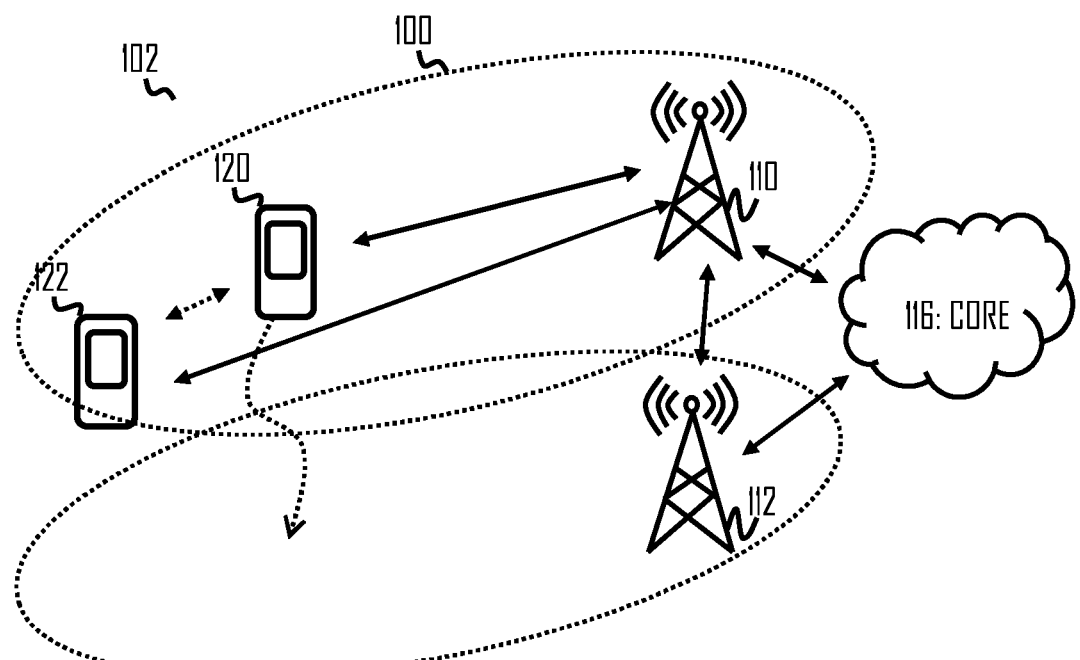

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments. For the purposes of the present disclosure, the phrases "A or B" and "A and/or B" means (A), (B), or (A and B). For the purposes of the present disclosure, the phrase "A, B, and/or C" means (A), (B), (C), (A and B), (A and C), (B and C), or (A, B, and C).

Embodiments described may be implemented in a radio system, such as one comprising at least one of the following radio access technologies (RATs): Worldwide Interoperability for Micro-wave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), LTE-Advanced, and enhanced LTE (eLTE). Term 'eLTE' here denotes the LTE evolution that connects to a 5G core. LTE is also known as evolved UMTS terrestrial radio access (EUTRA) or as evolved UMTS terrestrial radio access network (EUTRAN). A term "resource" may refer to radio resources, such as a physical resource block (PRB), a radio frame, a subframe, a time slot, a subband, a frequency region, a sub-carrier, a beam, etc. The term "transmission" and/or "reception" may refer to wirelessly transmitting and/or receiving via a wireless propagation channel on radio resources The embodiments are not, however, restricted to the systems/RATs given as an example but a person skilled in the art may apply the solution to other communication systems provided with necessary properties. One example of a suitable communications system is the system. The 3GPP solution to 5G is referred to as New Radio (NR). 5G has been envisaged to use multiple-input-multiple-output (MIMO) multi-antenna transmission techniques, more base stations or nodes than the current network deployments of LTE (a so-called small cell concept), including macro sites operating in co-operation with smaller local area access nodes and perhaps also employing a variety of radio technologies for better coverage and enhanced data rates. 5G will likely be comprised of more than one radio access technology/radio access network (RAT/RAN), each optimized for certain use cases and/or spectrum. 5G mobile communications may have a wider range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and being integrable with existing legacy radio access technologies, such as the LTE.

The current architecture in LTE networks is distributed in the radio and centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications). Edge cloud may be brought into RAN by utilizing network function virtualization (NVF) and software defined networking (SDN). Using edge cloud may mean access node operations to be carried out, at least partly, in a server, host or node operationally coupled to a remote radio head or base station comprising radio parts. Network slicing allows multiple virtual networks to be created on top of a common shared physical infrastructure. The virtual networks are then customised to meet the specific needs of applications, services, devices, customers or operators.

In radio communications, node operations may in be carried out, at least partly, in a central/centralized unit, CU, (e.g. server, host or node) operationally coupled to distributed unit, DU, (e.g. a radio head/node). It is also possible that node operations will be distributed among a plurality of servers, nodes or hosts. It should also be understood that the distribution of labour between core network operations and base station operations may vary depending on implementation. Thus, 5G networks architecture may be based on a so-called CU-DU split. One gNB-CU controls several gNB-DUs. The term ' gNB' may correspond in 5G to the eNB in LTE. The gNBs (one or more) may communicate with one or more UEs. The gNB-CU (central node) may control a plurality of spatially separated gNB-DUs, acting at least as transmit/receive (Tx/Rx) nodes. In some embodiments, however, the gNB-DUs (also called DU) may comprise e.g. a radio link control (RLC), medium access control (MAC) layer and a physical (PHY) layer, whereas the gNB-CU (also called a CU) may comprise the layers above RLC layer, such as a packet data convergence protocol (PDCP) layer, a radio resource control (RRC) and an internet protocol (IP) layers. Other functional splits are possible too. It is considered that skilled person is familiar with the OSI model and the functionalities within each layer.

In an embodiment, the server or CU may generate a virtual network through which the server communicates with the radio node. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU and the boundary where the responsibility is shifted between the CU and the DU may be selected according to implementation.

Some other technology advancements probably to be used are Software-Defined Networking (SDN), Big Data, and all-IP, to mention only a few non-limiting examples. For example, network slicing may be a form of virtual network architecture using the same principles behind software defined networking (SDN) and network functions virtualisation (NFV) in fixed networks. SDN and NFV may deliver greater network flexibility by allowing traditional network architectures to be partitioned into virtual elements that can be linked (also through software). Network slicing allows multiple virtual networks to be created on top of a common shared physical infrastructure. The virtual networks are then customised to meet the specific needs of applications, services, devices, customers or operators.

The plurality of gNBs (access points/nodes), each comprising the CU and one or more DUs, may be connected to each other via the Xn interface over which the gNBs may negotiate. The gNBs may also be connected over next generation (NG) interfaces to a 5G core network (5GC), which may be a 5G equivalent for the core network of LTE. Such 5G CU-DU split architecture may be implemented using cloud/server so that the CU having higher layers locates in the cloud and the DU is closer to or comprises actual radio and antenna unit. There are similar plans ongoing for LTE/LTE-A/eLTE as well. When both eLTE and 5G will use similar architecture in a same cloud hardware (HW), the next step may be to combine software (SW) so that one common SW controls both radio access networks/technologies (RAN/RAT). This may allow then new ways to control radio resources of both RANs. Furthermore, it may be possible to have configurations where the full protocol stack is controlled by the same HW and handled by the same radio unit as the CU.

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future rail-way/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node or by a gNB located on-ground or in a satellite.

The embodiments may be also applicable to narrow-band (NB) Internet-of-things (IoT) systems which may enable a wide range of devices and services to be connected using cellular telecommunications bands. NB-IoT is a narrowband radio technology designed for the Internet of Things (IoT) and is one of technologies standardized by the 3rd Generation Partnership Project (3GPP). Other 3GPP IoT technologies also suitable to implement the embodiments include machine type communication (MTC) and eMTC (enhanced MachineType Communication). NB-IoT focuses specifically on low cost, long battery life, and enabling a large number of connected devices. The NB-IoT technology is deployed "in-band" in spectrum allocated to Long Term Evolution (LTE)—using resource blocks within a normal LTE carrier, or in the unused resource blocks within a LTE carrier's guard-band—or "standalone" for deployments in dedicated spectrum.

The embodiments may be also applicable to device-to-device (D2D), machine-to-machine, peer-to-peer (P2P) communications. The embodiments may be also applicable to vehicle-to-vehicle (V2V), vehicle-to-infrastructure (V2I), infrastructure-to-vehicle (I2V), or in general to V2X or X2V communications.

FIG. 1 illustrates an example of a communication system to which embodiments of the invention may be applied. The system may comprise a control node 110 providing one or more cells, such as cell 100, and a control node 112 providing one or more other cells, such as cell 102. Each cell may be, e.g., a macro cell, a micro cell, femto, or a pico cell, for example. In another point of view, the cell may define a coverage area or a service area of the corresponding access node. The control node 110, 112 may be an evolved Node B (eNB) as in the LTE and LTE-A, ng-eNB as in eLTE, gNB of 5G, or any other apparatus capable of controlling radio communication and managing radio resources within a cell. The control node 110, 112 may be called a base station, network node, or an access node.

The system may be a cellular communication system composed of a radio access network of access nodes, each controlling a respective cell or cells. The access node 110 may provide user equipment (UE) 120 (one or more UEs) with wireless access to other networks such as the Internet. The wireless access may comprise downlink (DL) communication from the control node to the UE 120 and uplink (UL) communication from the UE 120 to the control node.

Additionally, although not shown, one or more local area access nodes may be arranged such that a cell provided by the local area access node at least partially overlaps the cell of the access node 110 and/or 112. The local area access node may provide wireless access within a sub-cell. Examples of the sub-cell may include a micro, pico and/or femto cell. Typically, the sub-cell provides a hot spot within a macro cell. The operation of the local area access node may be controlled by an access node under whose control area the sub-cell is provided. In general, the control node for the small cell may be likewise called a base station, network node, or an access node.

There may be a plurality of UEs 120, 122 in the system. Each of them may be served by the same or by different control nodes 110, 112. The UEs 120, 122 may communicate with each other, in case D2D communication interface is established between them.

The term "terminal device" or "UE" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

In the case of multiple access nodes in the communication network, the access nodes may be connected to each other with an interface. LTE specifications call such an interface as X2 interface. For IEEE 802.11 network (i.e. wireless local area network, WLAN, WiFi), a similar interface Xw may be provided between access points. An interface between an eLTE access point and a 5G access point, or between two 5G access points may be called Xn. Other communication methods between the access nodes may also be possible. The access nodes 110 and 112 may be further connected via another interface to a core network 116 of the cellular communication system. The LTE specifications specify the core network as an evolved packet core (EPC), and the core network may comprise a mobility management entity (MME) and a gateway node. The MME may handle mobility of terminal devices in a tracking area encompassing a plurality of cells and handle signaling connections between the terminal devices and the core network. The gateway node may handle data routing in the core network and to/from the terminal devices. The 5G specifications specify the core network as a 5G core (5GC), and there the core network may comprise e.g., an access and mobility management function (AMF) and a user plane function/gateway (UPF), to mention only a few. The AMF may handle termination of non-access stratum (NAS) signaling, NAS ciphering & integrity protection, registration management, connection management, mobility management, access authentication and authorization, security context management. The UPF node may support packet routing & forwarding, packet inspection and QoS handling, for example.

Network slicing in 5G is intended to address services with different kinds of requirements, while at the same time improving the efficiency of the network. Some services require low latencies and need to address local service content, some require high mobility, while other services are close to the current mobile broadband type characteristic without specific requirements on reliability or latency. The slicing principles in 5G allow a UE to be associated with more than a single slice, while still maintaining only a single signaling connection with the network.

The UE is provided information on the available slices when registering for the network (via NAS signaling), and a single UE may simultaneously access up to eight difference slices. Once a PDU session is set up, the UE is then signaled the Network Slice Selection Assistance Information (NSSAI). On the basis of this information, the network will select the appropriate slice instance (and related resources), with the AMF coordinating the actions in the 5G core side. There is one AMF that is common for all the slices a single UE has. This AMF will obtain information on which slices are allowed for a given subscription by interfacing with the Network Slice Selection Function (NSSF).

With slicing, it is possible to consider the customers needing different level of service. A network slice is uniquely identified via a slice ID called the S-NSSAI (Single-Network Slice Selection Assistance Information). Current 3GPP specifications allow a UE to be simultaneously connected and served by at most eight S-NSSAIs. On other hand, each cell may support tens or even hundreds of S-NSSAIs, e.g., in the current specifications a tracking area can have a support up to 1024 network slices.

Figure 2A:
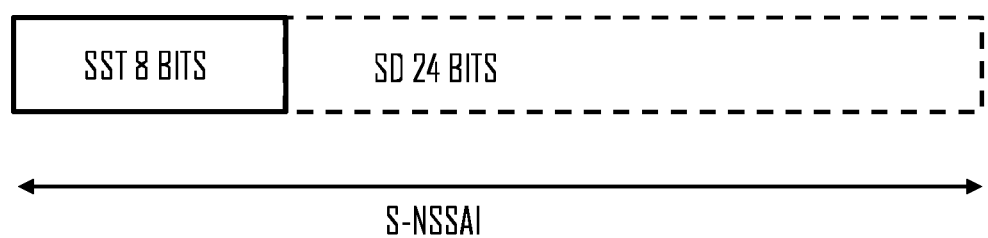
FIG. 2A shows an example of how a network slice can be identified.

The S-NSSAI may include both Slice Service Type (SST) and Slice Differentiator (SD) field with a total length of 32 bits, as shown in FIG. 2A, or include only SST field part in which case the length of S-NSSAI is 8 bits only. The S-NSSAI identifies each slice configured for the UE. The SD part of SNSSAI may be operator-defined only. The SST field may have standardized and non-standardized values. Values 0 to 127 belong to the standardized SST range. For instance, SST value of '1' may indicate that the slice is suitable for handling of eMBB, SST value of '2' may indicate that the slice is for handling of URLLC, etc.

One of the channels in communication networks is the so called physical random-access channel (PRACH as physical channel and/or simply RACH as transport channel). One of the PRACH, or in general RA, procedures is the so-called contention based random access (CBRA)-procedure. This procedure can be articulated in two or four steps, depending on a higher-layer configuration. In this application, the focus is on the 4-step variant for illustration, although the proposed solution is applicable to 2-step variant comprising MsgA and MsgB as well. In the following, random access is abbreviated as RA.

During initial access, RA procedure takes place after a preliminary set of operations is performed by both the gNB and the UE, such as the gNB 110 and the UE 120, for example. The preliminary set of operations comprises e.g. DL synchronization signal block (SSB) beam sweeping. In this step, the gNB 110 sends a sequence of beamformed SSBs. The UE 120 then measures a reference signal received power (RSRP) for all received SSB beams using a certain receive (RX) beam. Finally, the UE 120 selects an index of the preferred SSB and decodes its content, such as a master information block (MIB) and/or a system information block 1 (SIB1).

Figure 2B:
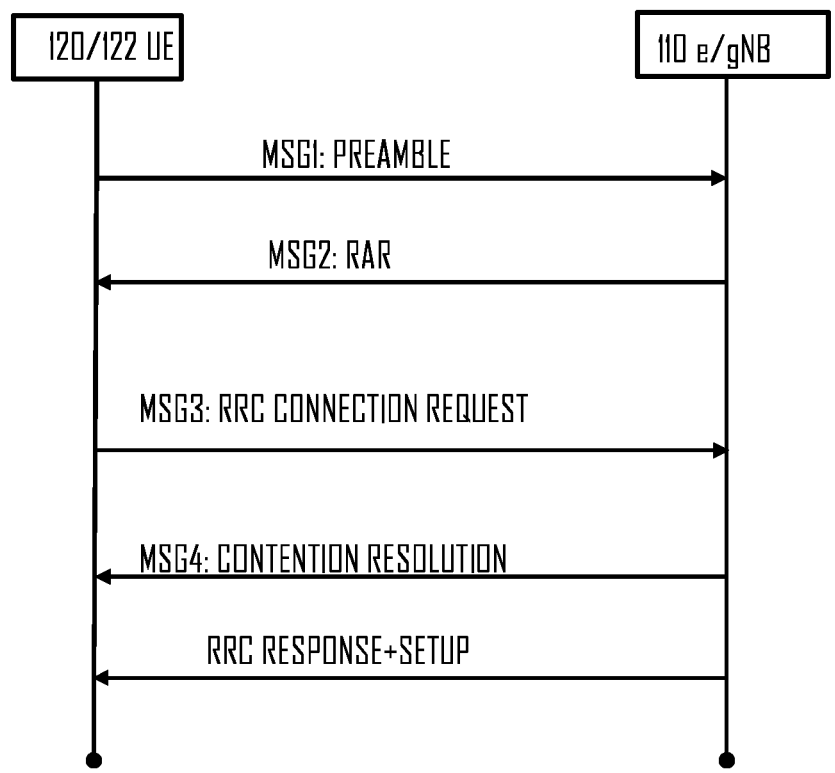
FIG. 2B shows a random access procedure, according to an embodiment.

Let us briefly take a look at a common RA process shown in FIG. 2B between the UE 120 and the gNB 110. Although applicable to many networks, we will in the following examples focus mainly on 5G (NR), for the sake of simplicity.

In the CBRA process, showed in FIG. 2B, the UE 120 selects one of available PRACH preambles out of maximum 64 available preambles based on the selected SSB beam index in beam sweeping procedure and sends it to gNB using a specific time and frequency resource known as random access-occasion (RO) in a message (Msg) 1 to the gNB 110. The UE 120 also needs to provide identity to the network so that network can address it in next step. The identity which the UE will use is called RA-RNTI (random access radio network temporary identity).

In the next step, the gNB 110 detects the preamble, calculates both the temporary C-RNTI associated to the RO over which the preamble has been received and a timing advance (TA), and sends a PUSCH uplink grant to the UE. This is called a random access-response (RAR), which is sent as Msg2 addressed to UE 120 with the relevant RA-RNTI. Msg2 may by default carry the following information: temporary C-RNTI, which is another identity given to the UE 120; TA value, which provides means for the UE to compensate for the roundtrip delay caused by UE's distance from the gNB 110; and an UL grant resource, which is assigned as an initial resource to UE so that it can use a physical uplink shared channel (PUSCH).

Then, by using the uplink shared channel, the UE 120 sends Msg3 to the network over the scheduled uplink resource on PUSCH. This Msg3 may be called "RRC connection request message". At this point the UE 110 is identified by the temporary C-RNTI.

Thereafter, the gNB may send Msg4 to the UE for contention resolution. After the RRC connection request of Msg3 is processed, a RRC response will be sent by gNB 110 to the UE 120. In an embodiment, although not shown, the RRC message (e.g. the RRC Connection Setup message) may be multiplexed with the Msg4 (i.e. sent with the MAC contention resolution CE).

With the contention based-RA process, there is some possibility that multiple UEs send PRACH with identical signatures. This may mean the same PRACH preamble from multiple UE reaches the network (e.g. gNB) at the same time. Due to such overlap/collision, the RACH process for one or more of the UEs simultaneously attempting the RACH process with the same preamble may fail. Due to this, the network may need to rely on the contention resolution of Msg4. The UEs that have lost the contention, i.e., collision due to selecting the same preambles from different UEs at the same time, may repeat the RA procedure There is another possibility to avoid collisions. In an embodiment, there are dedicated preambles for the UE to use. The network may have informed the UE which preamble signatures it should use. This kind of RACH process is called the contention free random access (CFRA) procedure. In such case, the UE sends a dedicated preamble (after selecting one from a pool of dedicated preambles) and the network responds with random access response (RAR, see Msg2 above). The contention free RA process may ensure that there are no two UEs using the same preamble at the same time, thus avoiding collisions and contention resolution. The CFRA is within the scope of the application, although the description is written from the point of view of the CBRA.

The above-mentioned RO is a resource specified in time and frequency domain available for the transmission of RACH preamble. E.g., in 3GPP new radio (NR/5G), SSB indices are associated with ROs via higher-layer signaling. Mapping flexibility is quite large, in order to accommodate different network deployments and loads.

One of the identified issues in the 3GPP RAN Slicing Study Item in Rel. 17 is that some enterprise/industrial scenarios have a requirement for access resource isolation, in order to provide guaranteed resources for predetermined sensitive slices e.g., in case of random access (RA) resources, or ROs in general. Another issue is that UEs may not be differentiated by the network side e.g. in case of the initial access, whereas some slices may need to be prioritized during the initial access e.g., in case of RA procedure.

Therefore, the initial access resources, e.g., RA resources in case of 5G slicing scenario, or in general RA configurations, are proposed to be categorized for different slices. However, currently a UE supporting and requesting certain slice cannot distinguish different RACH configurations for different slices, since RA procedure and gNB configurations for it are currently slice information agnostic.

If a same RA resource pool is used for all UEs, the source of threat cannot distinguish among users, cannot identify/track them based on the use of initial access resources or cannot target a specific slice. What a source of threat can do in such scenario is to attack the entire cell, which should be rapidly detected by OAM since the entire access to the cell will be broken. Moreover, the source of threat may not aim to attack but identify, locate and track certain slice UEs. If the resource pool is the same, it is not possible to easily identify and track the slice specific UEs.

At least in the case of mobile originated (MO) access, the only way to know the slice specific initial access resources, e.g., RACH resources, would be through the system information. This is transparent (e.g., cleartext) information and may not work for all purposes. Dedicated signaling may not be feasible, since the resource allocation can change in different cells, e.g., considering the geographical UE distributions and UE mobility. For example, the system information indicating that a slice 'X' can/should be accessed in random access with RO 'Y' may not work because such information reveals completely what resources are used for which slice and an observer can easily identify and track the UEs in that slice by observing the random access usage of that slice. This is a risk for the devices in the mission-critical/sensitive slice as the slice and/or the devices within associated with that slice can be easily identified, tracked and jammed. Also, the slice specific traffic and mobility can be monitored and analysed by unauthorized parties (e.g., source of threats).

It is beneficial to introduce resource isolation for the mission-critical slices (e.g., vertical UEs), for which the latency and the initial access requirements are typically tougher. While e.g. MBB slice may be network-wide available, the mission critical slice may not be available network wide. Therefore, if one cell fails to provide such a mission-critical service, it may not possible to replace it with another cell, as in case of MBB slice. However, for the purpose of the resource isolation, if the slice specific RACH resources are transparent to all UEs, the system might become more vulnerable to service specific and/or slice specific threats.

To at least partially tackle this problem, there is a proposed solution for slice specific random access resource isolation. Although applicable to many networks, we will in the following examples focus on 5G and eLTE, for the sake of simplicity.

Figure 3:
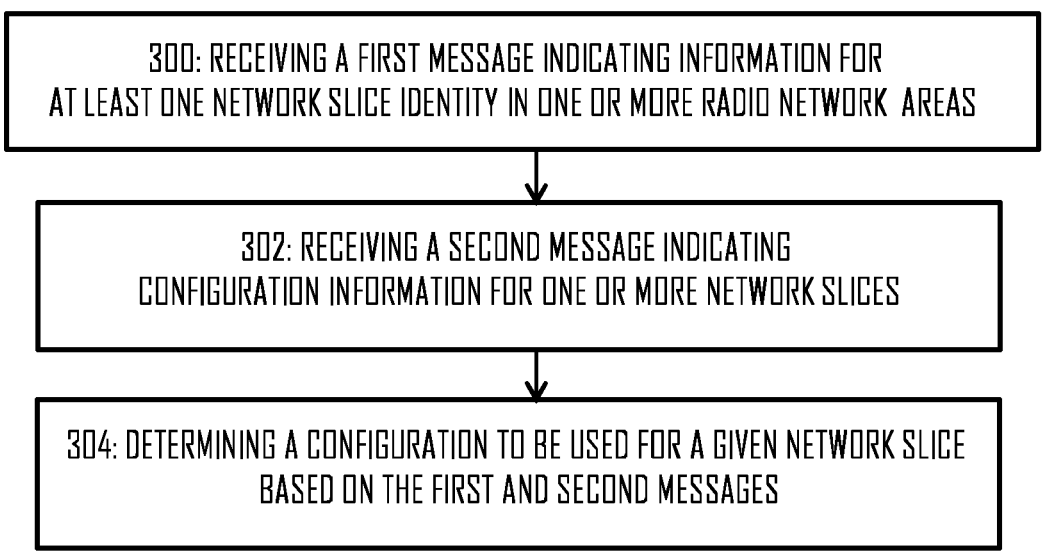

FIG. 3 depicts an example method. The method may be performed by a UE, such as the UE 120 of FIG. 1. Accordingly, as shown in FIG. 3, the UE 120 may in step 300 receive a first message. The first message indicates information (also known as slice mapping information or mapping information in the description) for at least one network slice identity in one or more radio network areas. The first message may also be called a first input or a first indicator, for example. The first message may be pre-configured in a UE. The first message may be received over wireless radio interface. The first message may be received from a base station, such as the currently serving gNB 110 (assuming the UE is connected to gNB 110). The first message may be received as a dedicated encrypted message, only receivable by the UE. Alternatively, the first message may be a multicast message receivable by any UE in a multicast group. The multicast group may share similar parameters regarding network slice requirements, for example.

In step 302, the UE 120 receives a second message, the second message indicating configuration information for one or more network slices. The second message may be received over wireless radio interface. The second message/input/indicator may be received while the UE is in RRC idle mode or RRC inactive mode. The second message may be received from the base station (such as gNB 112) that is providing the cell in which the UE is currently camping (e.g. cell 102). The second message may be received as a broadcasted message, receivable by any UE in the cell 102.

In step 304, the UE 120 determines a configuration to be used for a given network slice based on the first and second messages. That is, by combining the information provided in the messages, the UE 120 may be able to derive which configuration the UE should use when accessing e.g. network slice X in the cell 102 (assuming the cell 102 supports network slice X). Thereafter, the UE 120 may apply the determined configuration in operations (such as PRACH) with the gNB 112, for example.

Let us take a closer look on step 300 and the first message.

In an embodiment, the radio network area is or comprises a tracking area (TA). In other words, the granularity or validity area of the first message is TA. Consequently, the first message is given for a TA. One TA may comprise a plurality of cells/gNBs.

In another embodiment, the radio network area is or comprises at least one cell. In other words, the granularity or validity area of the first message is at least one cell. Consequently, the first message is given for at least one cell.

In another embodiment, the radio network area is or comprises at least one beam. In other words, the granularity or validity area of the first message is at least one beam. Consequently, the first message is given for at least one beam.

In another embodiment, the first message may indicate the mapping for more than one TA e.g., the current TA of the serving cell and one or more neighboring TAs. If the first message is not valid for a particular TA e.g., in case the UE 120 roams to a further TA, the UE 120 may fall back to the default/regular behaviour where the reception of the first message is not a prerequisite for the UE's operation.

In another embodiment, the radio network area is or comprises a RAN-based notification area (RNA) or a registration area. For example, the first message comprises mapping information for all the TAs in the RNA or in the registration area. On the other hand, it is noted that the TA specific first input may provide for a more consistent granularity, since the RNA and registration area may be different for different UEs and may require coordination thereof.

In an embodiment, the validity area of the first message is indicated explicitly by associating the first message with TAI(s) or TAC(s). In other embodiments, the first message is assumed to be valid for TA, RNA or the registration area where the first message was received without any explicit indication. In another embodiment, the validity area of the first message is indicated explicitly by associating the first message with a cell ID(s) and/or beam ID(s).

In an embodiment, the UE 120 receives the first input through an encrypted unicast/dedicated message. In an embodiment, the first message is an RRC message. In an embodiment, the RRC message may be an RRC release message when making the state transition to the inactive state or to idle state, or a paging message, just to mention a few nonlimiting examples. In another embodiment, the first message is a NAS message. The NAS signaling can be used for example when the core network (CN) provides the first message and RRC signaling can be used when the radio access network (RAN) provides the first message.

In an embodiment, when the CN signaling is used for providing the first input e.g., for a registration area, the CN may inform or update the RAN (e.g. gNB 110) on the used indexing. In another embodiment, RAN signaling is used for providing the first input e.g., for a TA or RNA. When RAN (e.g. gNB 110) provides the first input for a registration area, CN may need to explicitly inform the RAN on the registration area of the UE 120. This can take place via Core Network Assistance Information, for example. In an embodiment, in case there is only one TA indicated in the first message, the message may be provided by the RAN node (e.g. gNB 110) without information from the CN although some coordination with respect to the used indexing in the first input may be needed in the RAN level. In one of the embodiments, it may be necessary for RAN to receive from CN what indexing can be used or how index mapping can be done within a TA.

In an embodiment, the first message has a predetermined validity period. That is, the indicated first input is valid only for a certain period of time (e.g., during an existing T320 timer or another timer). In an embodiment, a new timer can be defined for storing the first input. In another embodiment, it could be additionally or alternatively event-based triggered storage so that UE 120 stores the content of the first message in memory until next configuration is received or until the UE 120 is detached from the network or until subscription data changes.

In case a timer is used, if the timer expires before receiving a new first input, the UE 120 may also fall back to the default/regular behaviour which is not tied to use of the first message. In an embodiment, if the first input needs to be updated, the UE 120 is notified/paged by the network as the UE-120 may need to go back to the connected mode in order to receive the first input.

Let us now look closer on example contents of the first message with respect to FIGS. 5A to 5C. As shown in FIGS. 5A and 5B, the mapping information indicates, for each of the one or more radio network areas, how a given network slice is indexed in the second message in a given radio network area. The mapping may be preconfigured in each radio network area (e.g. TA), for example, or the CN may define the mapping.

In some embodiments, the first input indicates how SST (Slice/Service Type) and SD (slice differentiator) values can be indexed by the system information within a TA, RNA or registration area. The indexing may be done such that SST/SD values (of the S-NSSAI) are scrambled and anonymized in each area. In an embodiment, different network slices are identified in the system information by a slice identity. The slice identity (ID) comprises at least one of a Slice/Service Type (SST) and a slice differentiator (SD).

FIG. 5A shows two columns. The left-hand side column indicates a slice ID, which in FIG. 5 comprises SST of the S-NSSAI. It is assumed that the slices can be identified with SST alone. The right-hand side column shows how each of the slice IDs can be mapped to a specific slice index in one or more TAs. For example, reading from the Table of FIG. 5A, the slice ID 2 corresponds/maps to slice index 1 in TA 0, to slice index 3 in TA 1 and to slice index 2 in TA 2.

FIG. 5B differs from FIG. 5A in that the slice ID is identified by both SST and SD. For example, slice ID having SST=1 and SD 0 (=third row of Table 5B) maps to slice index 2 in TA 0, to slice index 1 in TA 1 and to slice index 0 in TA 2.

FIG. 5C shows an embodiment, where the mapping information indicates, for each of the one or more radio network areas, how a given network slice is indexed in the second message in a given radio network area and which configuration is associated with which network slice. There the table comprises a third column indicating a configuration index in the respective TA for a given slice ID. For example, looking at the second row of the Table, the slice ID 0 corresponds/maps to slice index 0 and configuration index 1 in TA 0, to slice index 2 and to configuration index 0 in TA 1, and to slice index 3 and to configuration index 4 in TA 2.

In addition to an identifier (ID) of a slice, the identifier can be given to a slice group, and the mapping may indicate how a slice group maps to a slice index and possibly to a configuration index in each radio network area (which in the Tables 5A-5C is TA, for simplicity). A slice group may be identified with just the SST, as in FIGS. 5A and 5C, while a single slice may be identified with the SST+SD as in FIG. 5B.

In an embodiment, the list/table of all slices available in the relevant TAs and their mapping to the indexes are informed to the UE 120 in the first message. The disadvantage of this embodiment is that the amount of information may be large. However, it may be tolerable as it is given in a dedicated message.

In a further embodiment, the mapping information given to a UE 120 is limited to a subset of all network slices available in the TA(s). E.g. the subset may comprise only slices that are required by that UE 120. This may be desired from operators' point of view, as some operators might not want to disclose the full list of slices.

In an embodiment, the network provides the indexes only for the allowed NSSAIs of the particular UE 120. If the UE has a subscription to a slice that is not currently in the allowed NSSAIs, and thus the UE is not provided in the first message with an index that maps to the slice, the UE may fall back to the default/regular behaviour. This might happen, for example, when the UE did not include the slice ID at the time of registration or the network rejected it during registration, etc. The default/legacy operation does not include using the slice specific configuration of the first and second messages. Instead, the legacy operation comprises using a common resource pool as all other legacy UEs.

Let us then take a look at the step 302. In an embodiment, in step 302, the UE 120 receives a second input through a not encrypted broadcast message. Here, the broadcast message could be a system information block (SIB) message, for example in SIB1.

In an embodiment, the second message is slice specific, while in another embodiment the second message may be used for more than one slice. In the latter case an identical second message may be broadcast for the slices with similar slice characteristics, such as slice priority.

In an embodiment, the second input is valid for a cell or a gNB. This may be beneficial, as each cell may support a different set of slices. In one embodiment, the second input is simply assumed to be valid for a cell or for a gNB where it was received. In other embodiments, the second input could be valid for more than one cell or more than one gNB, and this can be indicated explicitly by including e.g. physical cell ID (PCI) or a similar ID information together with the second input. When the second message's content is valid for multiple cells/nodes, inter gNB coordination (among cells/nodes) regarding the broadcasted second message may be needed between the related gNBs.

In an embodiment, like for the content of the first message, the content of the second message may have a validity period, i.e. the content can be considered valid only for a certain period of time (e.g., while a timer is running) In embodiment, a new timer can be defined for storing the second input. In another embodiment, it could be additionally or alternatively event-based triggered storage, like the first message. In one embodiment, the validity period may have certain periodicity. E.g. the configuration may be valid during certain time intervals. In one embodiment, the second input is valid while the first input is valid. In case a timer is used, if the timer expires before receiving a new second input, the UE 120 may fall back to the default/legacy behaviour.

Figures 6B, 6C:

Let us look closer on example contents of the second message with respect to FIGS. 6A to 6C. As shown in FIGS. 6A and 6B, the configuration information of the second message indicates mapping between different configurations and different network slices, wherein each network slice is identified in the second message by an index specific to the radio network area where the second message is received. The indexes and their mapping to slice IDs is obtained from the first message, as explained earlier with reference to FIGS. 5A-5C, for example.

In the connection of FIGS. 6A-6C it is assumed the configuration index refers to PRACH configuration. In other words, the second message may indicate e.g. PRACH resource configuration (e.g., resource allocation and format) mapped to an index value (or more than one index value) which represents at least one of SST and SD, i.e. a given network slice. In an embodiment, the random access configuration comprises dedicated random access resources for a given network slice. This may ensure that a UE attempting to access the cell on a particular slice will get access to the cell more likely than if the UE was forced to use common resources or contention based resources.

However, it is noted that the embodiments are applicable for indicating other configurations as well or in addition to the PRACH configuration. For example, the second input may be a slice specific radio resource configuration other than the PRACH resource, such as medium access control (MAC) configuration (e.g., the configured parameters regarding power control) and/or physical layer (PHY) configuration (e.g., the configured parameters regarding the physical layer numerology) and/or in general regarding Radio Resource Management (RRM) related configuration (e.g., the configured parameters regarding the radio resource allocation for the data transmission). In case of indicating multiple configurations for a slice, the first message of FIG. 5C or the second message of FIGS. 6A-6B may be enhanced with additional columns mapping the slice index to additional configurations. Alternatively, one configuration index may correspond to combination of configurations, in which case no additional columns are needed in the Tables.

In an embodiment, the configuration (e.g., the PRACH configuration) is identified by an index. The UE may be aware of what a configuration index in this cell refers to. E.g., a certain configuration index may refer to a configuration where certain time/frequency resources are available. As one non-limiting example, a certain PRACH configuration index indicated in the second message may define that the UE is to send the PRACH preamble in certain time and/or frequency resources, or that it needs to use a certain preamble signature for the preamble. Such mapping information between the configuration indexes and radio resources may be pre-defined in the UE or pre-signaled to the UE or received e.g., in system information. Alternatively, although not shown in the FIGS. 6A-6C, the configuration mapping information of the second message may include e.g., a system frame, a subframe and a preamble format configuration information for each PRACH configuration index. Each cell may have its own-configuration configuration available for certain slices and these may be determined by the control node (e.g., gNB 112) of the cell.

FIG. 6A shows an example for the second input regarding how a PRACH resource index is mapped to slice index that was received in the first message. Based on this configuration mapping information of the second message, the UE 120 locating in TA 1 and wanting to access e.g. slice ID 0 (which based on the content of the first message, see Figure corresponds in TA 1 to slice index 2), determines based on a row corresponding to slice index 2 that the UE 120 may use configuration index 0, 1, 2, or 3. That is, in this cell, there are four different configurations useable for slice ID 0. Each configuration index may map to a specific time/frequency resources for transmittal of the PRACH preamble, for example. The number of configurations available for each slice index/slice ID is configurable by the network, and the configurations shown in FIGS. 6A-6B are non-limiting examples.

The row of FIG. 6A where slice index comprises [0,2] denotes that the PRACH configuration 3 is available for both slice indexes 0 and 2, which based on information of the first message correspond to slice IDs 2 and 3 in TA 1.

FIG. 6B shows the same content as Table of FIG. 6A but in condensed format. For example, the third row in FIG. 6B having slice index '1' means that slice index '1' is associated with or mapped to at least PRACH configuration 4, and possibly others ([ . . . ]), as shown in FIG. 6A on $6^{th}$ (and $7^{th}$ [ . . . ]) row(s).

FIG. 6C shows yet one embodiment, which may be combined with the embodiment of FIG. 5C. In this FIG. 6C embodiment, the second input may comprise the index value or values (corresponding to a specific slice ID or slice IDs, as given in the first message). The broadcasted indexes in the second message may comprise only those slice indexes that are supported in the cell where the UE is now located. In this example of FIG. 6C, the gNB (e.g. gNB 112) sending the second message supports only slice indexes 0 and 3. Assuming cell 102 is in TA 2, these slice indexes correspond to slice IDs 1 and 0, respectively.

As indicated in connection of FIG. 5C, the slice index is (in the first message) linked also the configuration index. Thus, a given slice index of the second message corresponds also to a configuration or configurations.

It should be noted that inside a TA each cell may support a different set of slices. E.g., in TA 0, cell 1 may support slice 2 with the PRACH resources from 0 to 5; and in the same TA 0, cell 2 may support slice 2 with the PRACH resources from 3 to 8. That means cell 1 and cell 2 would need to broadcast different index values even though both supports slice 2. That is because the random-access resource allocation can be different in each cell. In another embodiment, inside a TA each cell may support different resource combinations.

In an embodiment, the first message may be modified so that the validity area is a cell, instead of a TA. This may allow the UE to determine which configuration to use when the UE knows in which cell the UE receives the second message. In an embodiment, however, every cell in a TA (or in the used validity area) has the same PRACH configuration for a certain slice. In such case, the inputs of FIGS. 5C and 6C are enough for the UE 120.

As explained, in step 304, the first input and the second input are then used by the UE 120 as basis for the UE 120 obtaining an appropriate configuration for the required slice, e.g. for determining correct PRACH resource allocation dedicated for a required network slice.

In an embodiment, the UE 120 determines the radio network area where the UE is currently located among the one or more radio network areas of the first message. The determination of the configuration in step 304 may further be based on the determined radio network area where the UE 120 is currently locating.

Figure 7:
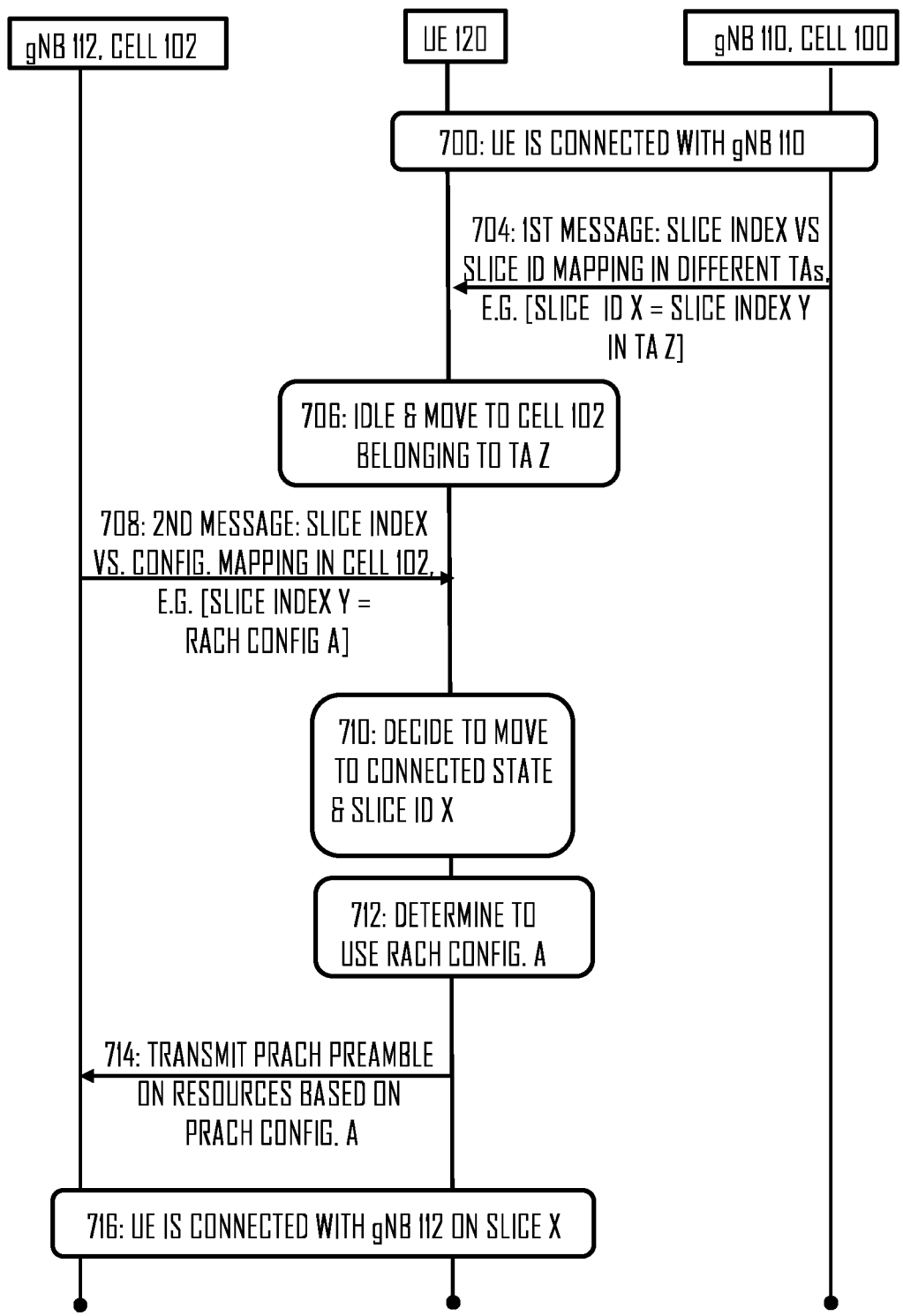
FIG. 7 depicts signaling flow diagram, according to an embodiment.

FIG. 7 shows a signaling flow diagram according to an embodiment. Let us assume that in step 700, the UE 120 is connected to gNB 110 providing cell 100. In step 704, the gNB 110 sends, possibly in RRC release message, to the UE 120 the first message. In this example embodiment, the first message indicates at least that slice ID X corresponds to slice index Y in TA Z.

In step 706, the UE moves to RRC idle or RRC inactive mode. It is also assumed that in step 706 the UE moves to the coverage area of cell 102 provided by the gNB 112, as shown in FIG. 1. It is assumed that cell 102 belongs to TA Z.

In step 708 the gNB 112 broadcasts the second message. This second message is detectable and receivable by the UE 120. The second message indicates at least that slice index Y corresponds to PRACH configuration A in this cell 102. Although this message is receivable by other UEs in the cell as well, the UEs that have note received the first message cannot understand the mapping of slice index to a slice ID.

In step 710 the UE decides to move to RRC connected state on slice ID X (=slice index Y). Accordingly, the UE 120 in step 712 determines to use the PRACH configuration A, as indicated in the second message. In step 714 the UE transmits PRACH preamble on resources based on the determined PRACH configuration A. The receiving gNB 112 may detect that this UE wants to connect on slice ID X. However, other UEs or tracking entities do not know which slice ID the UE 120 is now using, as these UEs or tracking entities have not received the first message. In step 716, the UE 120 is in connected mode on slice ID X with the gNB 112.

FIG. 4A shows the proposal from the point of view of a network node, such as the gNB 110. In step 400, the gNB 110 provides to a user equipment (e.g. the UE 120) the first message, the first message indicating information for at least one network slice in one or more radio network areas. As said, the first message may be an encrypted dedicated message. In more details, the first message may indicate at least, for each of the one or more radio network areas (also known as validity areas), how a given network slice is indexed in the second message in a given radio network area. FIG. 4B shows the proposal from the point of view of a network node, such as the gNB 112. In step 402, the gNB 112 provides to the user equipment (e.g. the UE 120) the second message, the second message indicating configuration mapping information for one or more network slices. As said, the second message may be a non-encrypted broadcast message. The second message may indicate e.g. mapping between different configurations and different network slices, wherein each network slice is identified in the second message by an index specific to the radio network area where the second message is received. In step 404, the gNB 112 detects from the user equipment a random access preamble on a random access configuration, wherein the configuration is determinable by the UE based at least partially on the second message. The determination of the configuration by the UE 120 may further be based on the first message, wherein the first message may be received from this gNB or from another gNB. In step 406, the gNB 112 determines a network slice the user equipment requires based on the random access configuration.

In an embodiment, the actions performed in FIGS. 4A and 4B are performed by the same network node. This may be the case when the UE 120 stays or returns to the same cell.

Even though described in connection of network slices, the embodiments are applicable for use in UE specific resource allocation in a broader perspective. For example, the embodiments are applicable for access category (AC)-based resource allocation. In such case the access category ID or set of category IDs would take the place of the slice ID, and the first message would map the AC ID to an AC index, while the second message would map the AC index to a configuration index in different validity areas (=radio network area/geographical area). When the access categories are utilized, operator defined access categories can also be used. In such a case, an access category may map to a slice, e.g., an access category number may map to a slice ID and such mapping can be utilized by various embodiments presented herein.

Some advantages of the embodiments may comprise e.g. that initial access resources, e.g. for random access, can be allocated in a manner that it is not easily used by third parties for tracking, identifying and attacking mission critical UEs. Thus, the embodiments may improve resilience of a (mission-critical) network which deploys mission critical slice (s).

Conventionally, a cell may broadcast the slice IDs (e.g. SST, SD) the cell supports but that is not linked to any slice specific configuration as provided in the first and second messages. Owing to the solution, regardless of the broadcast of the supported slices, the slice specific configuration is associated with slice indexes. However, to be able to understand what slice index correspond to in terms of SST and SD, the UE would benefit from receiving the first message where each slice ID (SST, SD) is mapped to a slice index, and then receiving the second message. In other words, without the first message, the second message is not useful as simply slice index does not on its own indicate to which slice ID it is mapped to.

Figure 8:
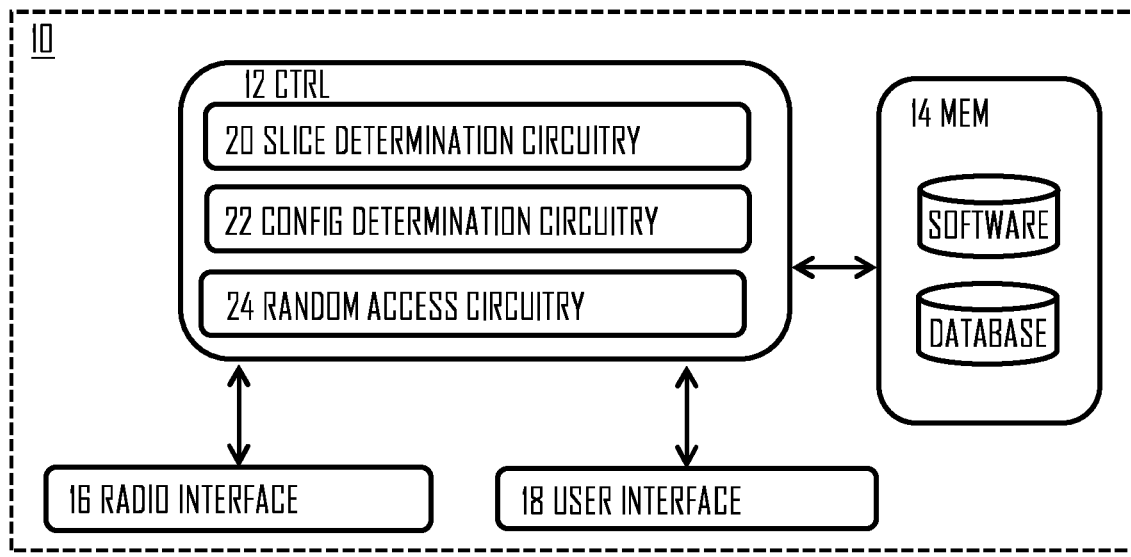
FIGS. 8 and 9 illustrate apparatuses, according to some embodiments.

An embodiment, as shown in FIG. 8, provides an apparatus 10 comprising a control circuitry (CTRL) 12, such as at least one processor, and at least one memory 14 including a computer program code (software), wherein the at least one memory and the computer program code (software), are configured, with the at least one processor, to cause the apparatus to carry out any one of the above-described processes. The memory may be implemented using any suitable data storage technology, such as semiconductor-based memory devices, flash memory, magnetic memory devices and systems, optical memory devices and systems, fixed memory and removable memory. The memory may comprise a database for storing data. The database of the memory may be used for storing e.g. the information carried in the first and second messages.

In an embodiment, the apparatus 10 may comprise the terminal device of a communication system, e.g. a user terminal (UT), a computer (PC), a laptop, a tabloid computer, a cellular phone, a mobile phone, a communicator, a smart phone, a palm computer, a mobile transportation apparatus (such as a car), a household appliance, or any other communication apparatus, commonly called as UE in the description. Alternatively, the apparatus is comprised in such a terminal device. Further, the apparatus may be or comprise a module (to be attached to the UE) providing connectivity, such as a plug-in unit, an "USB dongle", or any other kind of unit. The unit may be installed either inside the UE or attached to the UE with a connector or even wirelessly.

In an embodiment, the apparatus 10 is or is comprised in the UE 120. The apparatus may be caused to execute some of the functionalities of the above described processes, such as the steps of FIG. 3.

The apparatus may further comprise a radio interface (TRX) 16 comprising hardware and/or software for realizing communication connectivity according to one or more communication protocols. The TRX may be used for reception of the first and second messages, for example. The TRX may provide the apparatus with communication capabilities to access the radio access network, for example.

The apparatus may also comprise a user interface 18 comprising, for example, at least one keypad, a microphone, a touch display, a display, a speaker, etc. The user interface may be used to control the apparatus by the user.

The control circuitry 12 may comprise a slice determination circuitry 20 for determining which slices the apparatus supports or is needs, according to any of the embodiments. Each slice ID may be defined by SST or by SST+SD. The control circuitry 12 may further comprise a configuration determination circuitry 22 for determining a configuration for a given index based on the first and second messages, according to any of the embodiments. The control circuitry 12 may further comprise a random access circuitry 24 for performing random access on a specific slice on determined configuration, according to any of the embodiments.

Figure 9:
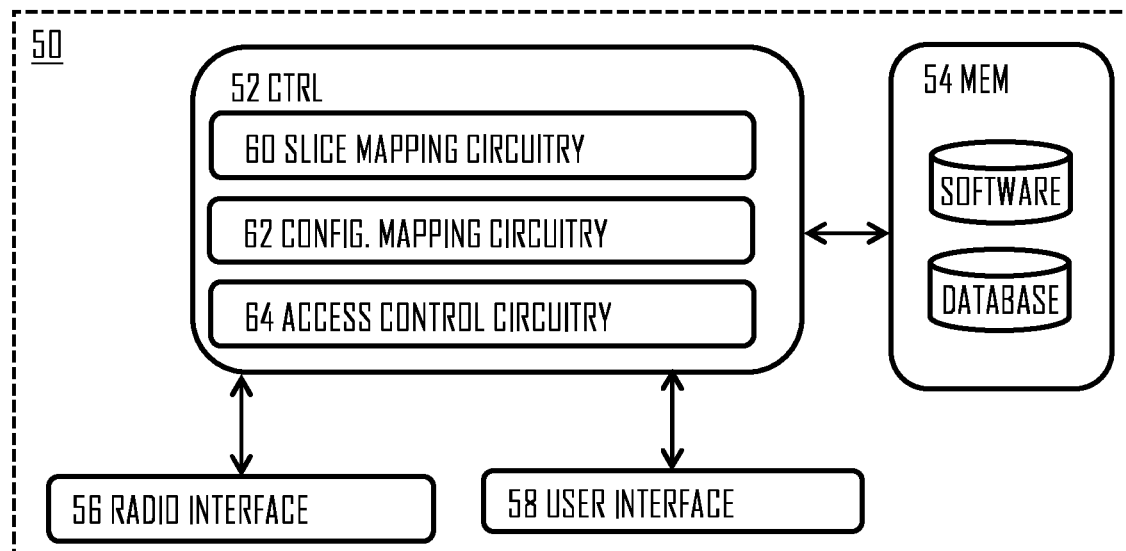

An embodiment, as shown in FIG. 9, provides an apparatus 50 comprising a control circuitry (CTRL) 52, such as at least one processor, and at least one memory 54 including a computer program code (software), wherein the at least one memory and the computer program code (software), are configured, with the at least one processor, to cause the apparatus to carry out any one of the above-described processes. The memory may be implemented using any suitable data storage technology, such as semiconductor-based memory devices, flash memory, magnetic memory devices and systems, optical memory devices and systems, fixed memory and removable memory. The memory may comprise a database for storing data. The stored data may comprise e.g. the slice mapping information and/or the configuration mapping information.

In an embodiment, the apparatus 50 may be or be comprised in a network node, such as in gNB/gNB-CU/gNB-DU of 5G. In an embodiment, the apparatus is or is comprised in the network node 110 or in the network node 112. The apparatus may be caused to execute some of the functionalities of the above described processes, such as the steps of FIGS. 4A and/or 4B.

In an embodiment, a CU-DU (central unit-distributed unit) architecture is implemented. In such case the apparatus 50 may be comprised in a central unit (e.g. a control unit, an edge cloud server, a server) operatively coupled (e.g. via a wireless or wired network) to a distributed unit (e.g. a remote radio head/node). That is, the central unit (e.g. an edge cloud server) and the radio node may be stand-alone apparatuses communicating with each other via a radio path or via a wired connection. Alternatively, they may be in a same entity communicating via a wired connection, etc. The edge cloud or edge cloud server may serve a plurality of radio nodes or a radio access networks. In an embodiment, at least some of the described processes may be performed by the central unit. In another embodiment, the apparatus may be instead comprised in the distributed unit, and at least some of the described processes may be performed by the distributed unit. In an embodiment, the execution of at least some of the functionalities of the apparatus 50 may be shared between two physically separate devices (DU and CU) forming one operational entity. Therefore, the apparatus may be seen to depict the operational entity comprising one or more physically separate devices for executing at least some of the described processes. In an embodiment, the apparatus controls the execution of the processes, regardless of the location of the apparatus and regardless of where the processes/functions are carried out.

The apparatus may further comprise communication interface (TRX) 56 comprising hardware and/or software for realizing communication connectivity according to one or more communication protocols. The TRX may provide the apparatus with communication capabilities to access the radio access network, for example. The TRX may be used for sending the first and/or second messages, for example.

The apparatus may also comprise a user interface 58 comprising, for example, at least one keypad, a microphone, a touch display, a display, a speaker, etc. The user interface may be used to control the apparatus by the user.

The control circuitry 52 may comprise a slice mapping circuitry 60 for determining/acquiring mapping between slice IDs and slice indexes, possibly in different TAs, according to any of the embodiments. The control circuitry 52 may comprise a configuration determination circuitry 62 e.g. for determining a configuration for the cell provided by the apparatus. For example, the gNB 112 (as the apparatus 50) may define that in cell 102 slice ID X can use configurations A and B. The control circuitry 52 may comprise an access control circuitry 64 e.g. for controlling access of the UEs to the cell. The circuitry 64 may be configured to determine the slice ID the UE is requesting based on the RACH configuration used by the UE, according to any of the embodiments.

In an embodiment, an apparatus carrying out at least some of the embodiments described comprises at least one processor and at least one memory including a computer program code, wherein the at least one memory and the computer program code are configured, with the at least one processor, to cause the apparatus to carry out the functionalities according to any one of the embodiments described. According to an aspect, when the at least one processor executes the computer program code, the computer program code causes the apparatus to carry out the functionalities according to any one of the embodiments described. According to another embodiment, the apparatus carrying out at least some of the embodiments comprises the at least one processor and at least one memory including a computer program code, wherein the at least one processor and the computer program code perform at least some of the functionalities according to any one of the embodiments described. Accordingly, the at least one processor, the memory, and the computer program code form processing means for carrying out at least some of the embodiments described. According to yet another embodiment, the apparatus carrying out at least some of the embodiments comprises a circuitry including at least one processor and at least one memory including computer program code. When activated, the circuitry causes the apparatus to perform the at least some of the functionalities according to any one of the embodiments described.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a nontransitory medium. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method performed by a user equipment, comprising:
   receiving a first message from a first network node as an encrypted message dedicated to the user equipment, the first message indicating information for at least one network slice in one or more radio network areas, wherein the information of the first message indicates, for each of the one or more radio network areas, how a given network slice is indexed in a second message in a given radio network area;
   receiving the second message from a second network node as a broadcasted message, the second message indicating configuration information for one or more network slices, wherein the configuration information of the second message indicates a mapping between different configurations and different network slices, wherein each network slice is identified in the second message by an index specific to the radio network area where the second message is received, and the configuration information of the second message indicates a random access configuration for a given network slice in the radio network area where the second message is received; and
   determining a configuration, including the random access configuration, to be used for a given network slice based on combining information of the first and second messages.

2. The method of claim 1, further comprising:
   determining a radio network area where the user equipment is currently located among the one or more radio network areas, wherein the determination of the configuration is further based on the determined radio network area.

3. The method of claim 1, wherein the radio network area is a tracking area.

4. The method of claim 1, wherein the radio network area is one of a RAN-based notification area, a registration area, a cell, or a beam.

5. The method of claim 1, wherein the information of the first message indicates, for each of the one or more radio network areas, how a given network slice is indexed in the second message in a given radio network area and which configuration is associated with which network slice.

6. The method of claim 1, wherein the information of the first message comprises only a subset of all network slices available in the one or more radio network areas.

7. The method of claim 6, wherein the subset of network slices comprises only those network slices that the user equipment is allowed to use.

8. The method of claim 1, wherein at least one of the first message or the second message has a predetermined validity period.

9. The method of claim 1, wherein the first network node is a core network node and the first message is received as a non-access stratum message, and the second network node is a radio access network node.

10. The method of claim 1, wherein the method comprises a two-message procedure to obtain isolation of a network slice-specific random access configuration in which the configuration, including the random access configuration, to be used for a given network slice is obtained in a non-transparent manner.

11. An apparatus comprising:
at least one processor; and
at least one memory storing instructions that when executed by the at least one processor, cause the apparatus at least to perform:
receiving a first message from a first network node as an encrypted message dedicated to the apparatus, the first message indicating information for at least one network slice in one or more radio network areas, wherein the information of the first message indicates, for each of the one or more radio network areas, how a given network slice is indexed in a second message in a given radio network area;
receiving the second message from a second network node as a broadcasted message, the second message indicating configuration information for one or more network slices, wherein the configuration information of the second message indicates a mapping between different configurations and different network slices, wherein each network slice is identified in the second message by an index specific to the radio network area where the second message is received, and the configuration information of the second message indicates a random access configuration for a given network slice in the radio network area where the second message is received; and
determining a configuration, including the random access configuration, to be used for a given network slice based on combining information of the first and second messages.

12. The apparatus of claim 11, wherein the apparatus is further caused to perform:
determining a radio network area where the apparatus is currently located among the one or more radio network areas, wherein the determination of the configuration is further based on the determined radio network area.

13. The apparatus of claim 11, wherein the radio network area is a tracking area.

14. The apparatus of claim 11, wherein the radio network area is one of a RAN-based notification area, a registration area, a cell, or a beam.

15. The apparatus of claim 11, wherein the information of the first message indicates, for each of the one or more radio network areas, how a given network slice is indexed in the second message in a given radio network area and which configuration is associated with which network slice.

16. The apparatus of claim 11, wherein the information of the first message comprises only a subset of all network slices available in the one or more radio network areas.

17. The apparatus of claim 16, wherein the subset of network slices comprises only those network slices that the apparatus is allowed to use.

18. The apparatus of claim 11, wherein at least one of the first message or the second message has a predetermined validity period.

19. The apparatus of claim 11, wherein the first network node is a core network node and the first message is received as a non-access stratum message, and the second network node is a radio access network node.

20. The apparatus of claim 11, wherein the apparatus is caused to perform, via a two-message procedure, obtaining isolation of a network slice-specific random access configuration in which the configuration, including the random access configuration, to be used for a given network slice is obtained in a non-transparent manner.

* * * * *